United States Patent
Sebire (10) Patent No.: US 7,889,689 B2
(45) Date of Patent: Feb. 15, 2011

(54) SUPPORTING A SWITCH BETWEEN CHANNELS FOR A MULTICAST TRANSMISSION

(75) Inventor: Guillaume Sebire, Helsinki (FI)

(73) Assignee: Nokia Corporation, Espoo (FI)

( * ) Notice: Subject to any disclaimer, the term of this patent is extended or adjusted under 35 U.S.C. 154(b) by 1161 days.

(21) Appl. No.: 10/648,850

(22) Filed: Aug. 26, 2003

(65) Prior Publication Data
US 2005/0047359 A1 Mar. 3, 2005

(51) Int. Cl.
H04H 20/71 (2008.01)
(52) U.S. Cl. .................................. 370/312; 370/432
(58) Field of Classification Search .................. None
See application file for complete search history.

(56) References Cited

U.S. PATENT DOCUMENTS

| | | | | |
|---|---|---|---|---|
| 5,093,924 A | * | 3/1992 | Toshiyuki et al. | 455/450 |
| 5,572,678 A | * | 11/1996 | Homma et al. | 709/227 |
| 6,529,740 B1 | * | 3/2003 | Ganucheau et al. | 455/519 |
| 6,571,112 B1 | * | 5/2003 | Ramaswamy | 455/466 |
| 6,577,609 B2 | * | 6/2003 | Sharony | 370/312 |
| 6,810,236 B2 | * | 10/2004 | Terry et al. | 455/67.11 |
| 2001/0024428 A1 | * | 9/2001 | Onouchi | 370/329 |
| 2001/0046877 A1 | * | 11/2001 | Ohkubo et al. | 455/522 |
| 2003/0220119 A1 | * | 11/2003 | Terry | 455/466 |
| 2004/0064508 A1 | * | 4/2004 | Ayyagari et al. | 709/205 |

OTHER PUBLICATIONS

3$^{rd}$ Generation Partnership Project (3GPP) Technical Specification (TS) 44.060, version 5.1.1 (May 2002), "*General Packet Radio Service; Mobile Station—Base Station System Interface; Radio Link Control/Medium Access Control Protocol*," Release 5, 2002, 306pp.
3GPP TS 45.002, version 6.2.0 (Jun. 2003), "*Radio Access Network; Multiplexing and Multiple Access on the Radio Path*," Release 6, 2003, 83pp.
3GPP TS 45.008, version 5.11.0 (Jun. 2003), "*Radio Access Network; Radio Subsystem Link Control*," Release 5, 2003.
3GPP TSG Geran WG2#14bis, Agenda Item 5.3.3, Nokia Discussion, "*MBMS Bearer Changes*," San Diego, CA, May 19-23, 2003, 4pp.

* cited by examiner

*Primary Examiner*—Robert W Wilson
(74) *Attorney, Agent, or Firm*—Alfred A. Fressola; Ware, Fressola, Van Der Sluys & Adolphson LLP (57) ABSTRACT

The invention relates to switching between a point-to-multipoint channel and a point-to-point channel for transmitting multicast data from a mobile communication network to a mobile station. According to a first aspect of the invention, the mobile station determines the link quality of a point-to-multipoint channel employed for the transmission and requests from the network a switch to a point-to-point channel in case the determined link quality is too low. According to a second aspect of the invention, the network estimates the link quality of a point-to-multipoint channel while using at least a point-to-point channel for the transmission of multicast data, and orders the mobile station to switch to this point-to-multipoint channel, in case the estimated link quality of the point-to-multipoint channel is sufficiently high.

29 Claims, 7 Drawing Sheets

Fig. 1

Bearer change within a cell

| from \ to | p-t-p | p-t-m |
|---|---|---|
| p-t-p | Yes | Yes (1) |
| p-t-m | Yes (2) | (Yes) |
| (1) Only if *n* p-t-p bearers consume significantly more radio resources than *1* p-t-m ||| 
| (2) Only in case of establishment of a non-MBMS service in parallel |||

Fig. 2a

Bearer change after cell change

| from \ to | p-t-p | p-t-m |
|---|---|---|
| p-t-p | Yes | Yes (1) |
| p-t-m | Yes (2) | Yes |
| (1) Only if p-t-m is already established in the new cell |||
| (2) Only if p-t-m is not already established in the new cell. |||

Link quality levels

| MBMS Service | Minimum Link Quality Level |
|---|---|
| Service 1 | $LQL_1$ |
| Service 2 | $LQL_2$ |
| ... | ... |
| Service i | $LQL_i$ |
| ... | ... |
| Service n | $LQL_n$ |
| $LQL_i \geq LQL_{i+1}$ with i=1 .. n-1 | |

SUPPORTING A SWITCH BETWEEN CHANNELS FOR A MULTICAST TRANSMISSION

FIELD OF THE INVENTION

The invention relates to methods supporting a switch between a point-to-multipoint channel and a point-to-point channel for transmitting multicast data from a mobile communication network to a mobile station. The invention relates equally to a corresponding mobile station, to corresponding sub-networks of a mobile communication network, to corresponding mobile communication systems and to corresponding software program products.

BACKGROUND OF THE INVENTION

A mobile communication network can transmit data to a mobile station over the radio interface using a point-to-point (p-t-p) transmission or a point-to-multipoint (p-t-m) transmission.

Figure 1:
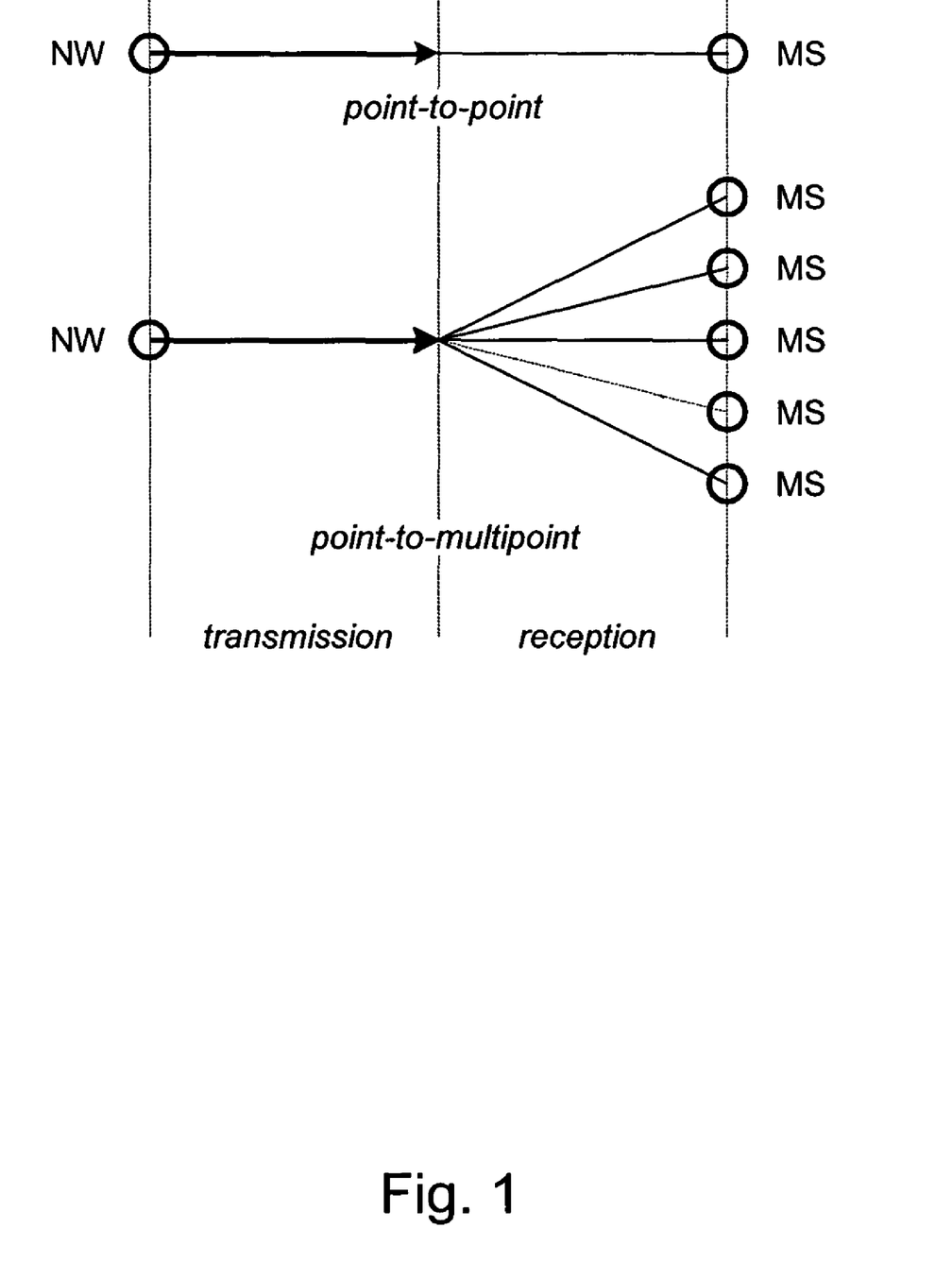
FIG. 1 is a diagram illustrating p-t-p and p-t-m transmissions.

A p-t-p transmission is a single transmission that is addressed to a unique mobile station and that can be received only by this unique mobile station. FIG. 1 illustrates in an upper part such a point-to-point transmission from a network NW to a mobile station MS. A p-t-m transmission, in contrast, is a single transmission that is addressed to a plurality of mobile stations and that can be received by this plurality of mobile stations. FIG. 1 illustrates in a lower part such a point-to-multipoint transmission from a network NW to a plurality of mobile stations MS. In the following, a p-t-p channel refers to a radio channel on which a p-t-p transmission is carried out, and a p-t-m channel refers to a radio channel on which p-t-m transmission is carried out. Similarly, a p-t-p bearer refers to a radio bearer which is used on a p-t-p channel, and a p-t-m bearer refers to a radio bearer which is used on a p-t-m channel.

For Multimedia Broadcast and Multicast Services (MBMS), for example, it is planned to allow MBMS data transmissions via p-t-p channels and/or p-t-m channels. It is further planned, that a switch between a point-to-point channel and a point-to-multipoint channel is enabled during an ongoing data transfer.

Figure 2A:
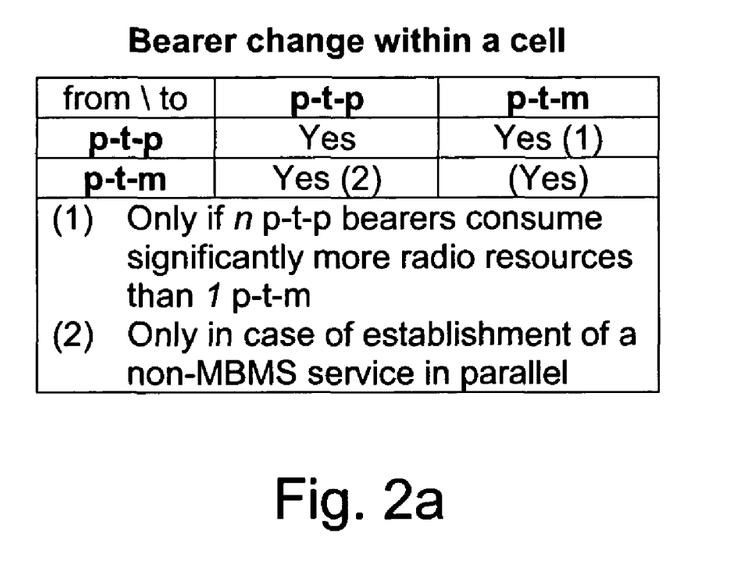
FIGS. 2a and b are tables indicating planned bearer changes in a cell and after a cell change, respectively.
Figure 2B:
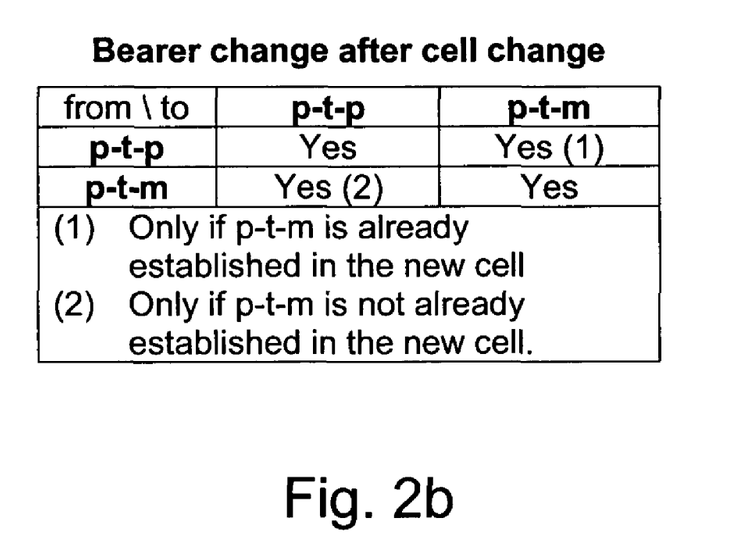

FIG. 2a is a table presenting an exhaustive list of the bearer changes that are expected to occur for MBMS services within a cell, and FIG. 2b is a table presenting an exhaustive list of the bearer changes that are expected to occur for MBMS services after cell change. Both tables were taken from the document 3GPP TSG GERAN2#14bis, G2-030374, "MBMS bearer changes", Nokia, San Diego, Calif., USA, 19-23 May, 2003. P-t-p to p-t-p and p-t-m to p-t-m changes are required within a cell and after a cell change due to possibly required reconfigurations of the physical resources. Within a cell, p-t-p to p-t-m changes are carried out only if n p-t-p bearers consume significantly more radio resources than one p-t-m. The default assumption is the usage of p-t-m anyhow. P-t-m to p-t-p changes are carried out only if a non-MBMS service is established in parallel to the MBMS service. After a cell change, p-t-p to p-t-m changes are carried out only if p-t-m is already established in the new cell. P-t-m to p-t-p changes are carried out only if p-t-m is not already established in the new cell. This requires the mobile station to notify itself to the network.

It is an assumption in on-going discussions on MBMS that for allowing a switch between a p-t-p bearer and a p-t-m bearer during an active multicast session, i.e. while data transfer is on-going, some synchronization is needed between the p-t-p bearer and the p-t-m bearer so that the application in the mobile station can continue running normally after the bearer change. A prerequisite for this is the tolerance of the application to the data interruption, which may be lossless or lossy, caused by the bearer change. While a lossless data interruption causes basically no problem in case of background traffic apart from taking more time to receive the payload, it could affect the user perception in case of streaming traffic when the interruption lasts longer than the duration corresponding to the amount of data in the application buffer. The user may experience, for example, a black screen, a freeze in a video presentation or silence in an audio presentation. It has to be noted, however, that it is acknowledged that bearer changes should be avoided during an active session.

While the necessity of supporting a switch from a p-t-p channel to a p-t-m channel is not clear yet, the reverse switch from a p-t-m channel to a p-t-p channel has to be supported. It is assumed that for a parallel support of MBMS and non-MBMS services, the MBMS service should be provided to the mobile station via a p-t-p connection. Thus, the establishment of a non-MBMS service for a particular mobile station monitoring one or more given MBMS service on the p-t-m channel may lead, depending on the capabilities of the mobile station, to the establishment of an MBMS p-t-p connection once the non-MBMS service is established, in order to ensure MBMS service continuity.

A p-t-p link can be optimized individually for each mobile station by means of link adaptation and power control. It is a characteristic of a p-t-m channel, on the contrary, that the link is not optimized individually for each mobile station. For example, no link adaptation occurs, and the signal power has to be sufficient to address all mobile stations monitoring the channel.

Figure 3A:
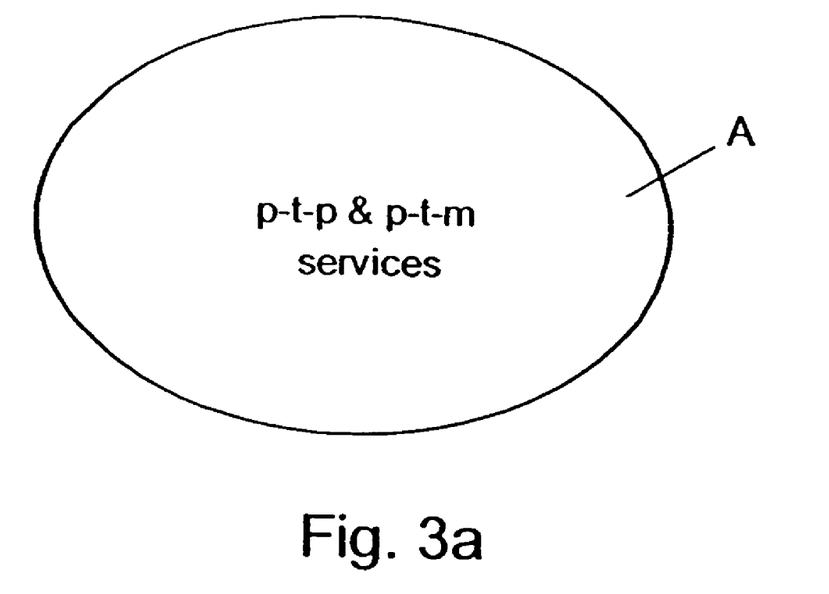
FIGS. 3a and b are diagrams illustrating the coverage with p-t-m and p-t-p channels in case of good and bad conditions, respectively.
Figure 3B:
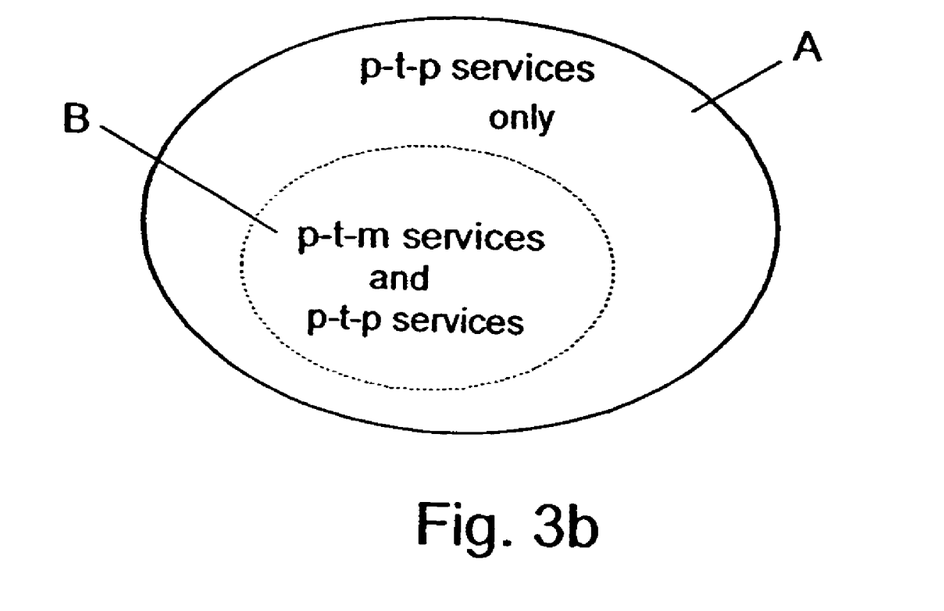

The resulting discrepancy in service between p-t-p transmissions and p-t-m transmissions is illustrated in FIGS. 3a and 3b. FIG. 3a is a diagram showing an area A in which a mobile station may acquire p-t-p and p-t-m channels in case of a good coverage and/or a high link quality. FIG. 3b is a diagram showing a first area A corresponding to the area A of FIG. 3a. Due to the enabled link adaptation and power control, a mobile station may acquire p-t-p channels throughout this area A even in case of a weak coverage and/or a bad link quality. FIG. 3b further shows a second area B, which is considerably smaller than the first area A and which lies within the first area A. In case of a weak coverage and a bad link quality in the area outside of B, a mobile station is only able to acquire p-t-p channels, while in reduced area B, both p-t-p and p-t-m channels are available.

This raises a problem which has not been dealt with so far. P-t-m data may be lost, when the radio link quality drops below the minimum quality required at the mobile station for acquiring the p-t-m channel. In case a mobile station is acquiring data for a given service over p-t-m and the radio conditions weakens, the mobile station may not be able to get the data through anymore.

SUMMARY OF THE INVENTION

It is an object of the invention to ensure a continuous reception of data for a multicast service at a mobile station.

It is further an object of the invention to support a reduction of the amount of radio resources occupied by a multicast service.

For a first aspect of the invention, a method supporting a switch from a p-t-m channel to a p-t-p channel for transmitting multicast data from a mobile communication network to a mobile station is proposed. In a first step of this method, the mobile station determines a link quality of a p-t-m channel based on link quality related measurements on the p-t-m channel, which p-t-m channel is currently used by the mobile communication network for transmitting multicast data. In a second step of this method, the mobile station requests from the mobile communication network the transmission of the multicast data via a p-t-p channel, in case the determined link quality lies below a given link quality.

For the first aspect of the invention, moreover a mobile station is proposed, which comprises a measuring portion for performing link quality related measurements on a p-t-m channel via which the mobile station receives multicast data from a mobile communication network. The mobile station further comprises a processing portion for determining a link quality of a p-t-m channel based on measurement results provided by the measuring portion and for comparing a determined link quality with a given link quality. The mobile station further comprises a transmitting portion for transmitting a request to a mobile communication network to transmit multicast data via a p-t-p channel, in case the processing portion detects that a determined link quality of a p-t-m channel employed for transmitting the multicast data lies below a given link quality.

For the first aspect of the invention, moreover a sub-network of a mobile communication network is proposed, which comprises a receiving portion for receiving from a mobile station a request to switch from using a p-t-m channel to using a p-t-p channel for transmitting multicast data to the mobile station. The sub-network further comprises a processing portion for switching upon such a request received by the receiving portion from using a p-t-m channel to using a p-t-p channel for transmitting multicast data to the mobile station.

For the first aspect of the invention, moreover a mobile communication system is proposed which comprises the mobile station and the sub-network proposed for the first aspect of the invention.

For the first aspect of the invention, finally a software program product such as a processor readable medium is proposed, in which a software code for supporting a switch from a point-to-multipoint channel to a point-to-point channel for transmitting multicast data from a mobile communication network to a mobile station is stored. When running in a processing component of a mobile station, e.g. in the processing portion of the above proposed mobile station, the proposed software code realizes a step of determining a link quality of a point-to-multipoint channel based on link quality related measurements on the point-to-multipoint channel, which point-to-multipoint channel is currently used by the mobile communication network for transmitting multicast data. The proposed software code further realizes a step of causing a request to the mobile communication network to transmit the multicast data via a point-to-point channel, in case the determined link quality lies below a given link quality.

For a second aspect of the invention, a method supporting a switch from a p-t-p channel to a p-t-m channel for transmitting multicast data from a mobile communication network to a mobile station is proposed. In a first step of this method, the mobile communication network estimates a link quality of a p-t-m channel while transmitting multicast data on a point-to-point channel to the mobile station. In a second step of this method, the mobile communication network orders the mobile station to switch from the p-t-p channel to the p-t-m channel for receiving the multicast data, in case the estimated link quality of the p-t-m channel reaches a required link quality.

For the second aspect of the invention, moreover a sub-network of a mobile communication network is proposed, which comprises a transmitting portion for transmitting multicast data using at least one of a p-t-p channel and a p-t-m channel. The sub-network further comprises a processing portion for estimating the link quality of a p-t-m channel while the transmitting portion uses a p-t-p channel for transmitting multicast data to a mobile station, and for ordering this mobile station to switch from the p-t-p channel to the p-t-m channel for receiving the multicast data, in case the estimated link quality lies above a required link quality.

For the second aspect of the invention, moreover a mobile communication system is proposed which comprises the sub-network proposed for the second aspect of the invention and in addition a mobile station including a receiving portion for receiving multicast data from a mobile communication network.

For the second aspect of the invention, finally a software program product is proposed, in which a software code for supporting a switch from a point-to-point channel to a point-to-multipoint channel for transmitting multicast data from a mobile communication network to a mobile station is stored. When running in a processing component of a mobile communication network, e.g. in the processing portion of the above proposed sub-network, the proposed software code realizes a step of estimating a link quality of a point-to-multipoint channel while the mobile communication network is transmitting multicast data on a point-to-point channel to the mobile station.

The proposed software code further realizes a step of causing an order to the mobile station to switch from the point-to-point channel to the point-to-multipoint channel for receiving the multicast data, in case the estimated link quality of the point-to-multipoint channel reaches a required link quality.

The invention proceeds from the consideration that p-t-p allows a reaching of potentially higher QoS requirements than p-t-m in all channel conditions. Thus, there is a discrepancy in service provision between p-t-p and p-t-m transmissions, which has to be taken into account when enabling a switching between p-t-p and p-t-m channels. While a service which is being transmitted over a p-t-m channel could well be transferred to a p-t-p channel, it might not necessarily be possible to achieve the opposite. If the same service can be provided through either a p-t-p transmission or a p-t-m transmission within good coverage, it may not be possible to provide a given service over a p-t-m channel when the coverage and/or the link quality weakens, for example at cell borders.

For the first aspect of the invention, it is therefore proposed to switch from a p-t-m to a p-t-p transmission when the reception on a p-t-m channel becomes critical due to a low radio link quality. This requires the mobile station to process link quality measurements on the p-t-m channel and to be aware of the minimum acceptable link quality level for p-t-m reception for a given service or for the p-t-m channel as a whole.

It is an advantage of the first aspect of the invention that it allows the ensuring of a multicast service continuity when the radio conditions become too bad to continue the acquisition of a given service on a p-t-m channel.

For the second aspect of the invention, it is proposed to switch from a p-t-p to a p-t-m transmission when the radio conditions become good enough for acquisition of a given multicast service on a p-t-m channel. The sub-network is enabled to this end to estimate the channel quality of the p-t-m channel. The mobile communication network may estimate the link quality for example based on measurement reports from a mobile station comprising results of measurements performed by the mobile station for the p-t-p channel. It has to be noted, however, that the mobile communication network may have other means to estimate the link quality as well. If the link quality is sufficiently high, the mobile communication network may then order the mobile station to switch from the p-t-p channel to this p-t-m channel for receiving the multicast data. If the mobile communication network is not transmitting the same multicast data on a p-t-m channel anyhow, it further switches from using the p-t-p channel to using the p-t-m channel for transmitting the multicast data.

It is an advantage of the second aspect of the invention that it allows a sparing of radio resources, since a p-t-m channel can be used for transmitting the same multicast data via a single channel to several mobile stations. At the same time, it is ensured that a switching is only performed in case the p-t-m channel is suited for a transmission to a particular mobile station.

In case a p-t-p link quality is used to estimate the channel quality of a p-t-m link, it is a prerequisite that the channel quality of the p-t-p link is a fairly good representative of the channel quality of the p-t-m link. The impacts of the mobility of the mobile station are assumed to be similar across all timeslots allocated to this mobile station. That is, the fading type, e.g. slow or fast fading, experienced by a mobile station is the same across all timeslots, only the amplitude of the fading changes. In fact, in case of multislot allocation, all timeslots in the allocation are subject to the same frequency parameters, hence, if frequency hopping is used, the same hopping sequence is usually applied to all timeslots, as described in the technical specification 3GPP TS 44.060 V.5.1.1: "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol" (2002-05) and in the technical specification 3GPP TS 45.002 V.6.2.0: "Technical Specification Group GSM/EDGE Radio Access Network; Multiplexing and multiple access on the radio path" (2003-06).

The hopping characteristics of the p-t-p channel and the p-t-m channel may be one of the following cases:

a) p-t-p is hopping and p-t-m is not hopping;
b) p-t-p is hopping and p-t-m is hopping;
c) p-t-p and p-t-m are hopping with different hopping sequences, i.e. the list of frequencies in the sequences are different between the p-t-p channel and the p-t-m channel;
d) neither p-t-p nor p-t-m are hopping; and
e) p-t-p and p-t-m are hopping with the same or with a different hopping sequence, but the list of frequencies in the sequence(s) is the same.

The highest synergies between p-t-p and p-t-m link qualities are reached in the above cases d) and e), and possibly in case c). Besides, the likelihood for encountering case a) or case b) in a real network is assumed to be low if not null, unless for case a) PBCCH (Packet Broadcast Control CHannel) and PCCCH (Packet Common Control CHannel) are not supported in the cell since the BCCH (BroadCast CHannel) carrier cannot hop and the p-t-m is located the BCCH carrier, which is unlikely when MBMS is deployed.

Both aspects have in common that the mobile communication network is caused to switch between a p-t-m channel and a p-t-p channel for transmitting multicast data to the mobile station, in case the determined or estimated link quality on the p-t-m channel indicates that a switch is recommendable.

It is to be understood that both aspects of the invention can advantageously be combined in a single mobile station, a single sub-network and a single mobile communication system, respectively. In this case, however, care should be taken to avoid a ping-pong effect due to a repeated switching between a p-t-m channel and a p-t-p channel.

The invention can be employed in particular for MBMS services, but equally for any other kind of multicast services.

The invention can further be used for example, though not exclusively, with GERAN (GSM/EDGE Radio Access Network) or UTRAN (UMTS Terrestrial Radio Access Network). The sub-network may thus be for example a GERAN or an UTRAN, a BSS (Base Station Subsystem) of a GERAN or an RNS (Radio Network Subsystem) of an UTRAN, or one or more network elements of such a BSS or such an RNS.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 4:
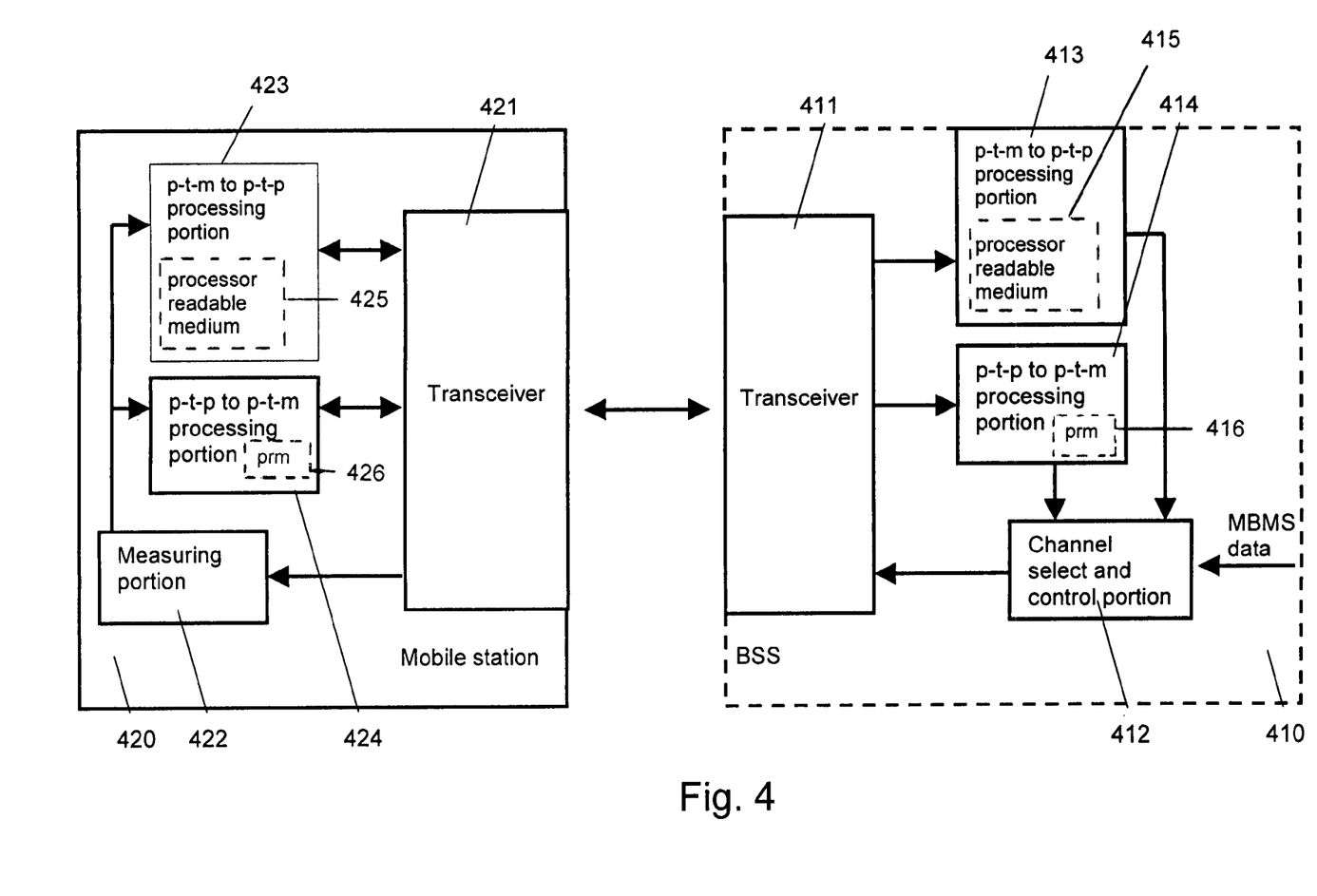
FIG. 4 is a schematic block diagram illustrating a radio access network and a mobile station as part of a mobile communication system in which an embodiment of the invention is implemented.

FIG. 4 is a schematic block diagram of a part of a mobile communication system in which a BSS 410 of a mobile communication network may switch between p-t-m and p-t-p transmissions to a specific mobile station 420 in accordance with the invention.

The BSS 410 can be for instance a sub-network of a GERAN. It comprises a transceiver 411, a channel selection and control portion 412, a p-t-m to p-t-p processing portion 413, including a processor readable medium 415 for storing software code, and a p-t-p to p-t-m processing portion 414, including a processor readable medium 416 for storing software code. The channel selection and control portion 412 has a data input for receiving MBMS data and an output which is connected to the transceiver 411. The p-t-m to p-t-p processing portion 413 has an input which is connected to the transceiver 411 and an output which is connected to a first control input of the channel selection and control portion 412. The p-t-p to p-t-m processing portion 414 has equally an input which is connected to the transceiver 411 and an output which is connected to a second control input of the channel selection and control portion 412. The depicted components of the BSS 410 may belong to a single network element or be distributed to several network elements. It is further to be understood that the BSS 410 comprises additional components as known from the art, which are not depicted in FIG. 4. The depicted connections may be direct connections or indirect connections via other components not shown.

The mobile station 420 comprises a transceiver TX/RX 421, a measuring portion 422, a p-t-m to p-t-p processing portion 423 and a p-t-p to p-t-m processing portion 424. The transceiver 421 is connected to an input of the measuring portion 422, to an input of the p-t-m to p-t-p processing portion 423, including a processor readable medium 425 for storing software code, and to an input of the p-t-p to p-t-m processing portion 424, including a processor readable medium 426 for storing software code. An output of the measuring portion 422 is connected on the one hand to an input of the p-t-m to p-t-p processing portion 423 and on the other hand to a second input of the p-t-p to p-t-m processing portion 424. An output of the p-t-m to p-t-p processing portion 423 and an output of the p-t-p to p-t-m processing portion 424 are connected to the transceiver 421. It is to be understood that also the mobile station 420 comprises additional components as known from the art, which are not depicted in FIG. 4. The depicted connections may be direct connections or indirect connections via other components not shown.

The BSS 410 and the mobile station 420 of FIG. 4 are designed for supporting both, a switch from a p-t-m transmission to a p-t-p transmission of MBMS data and a switch from a p-t-p transmission to a p-t-m transmission of MBMS data.

The network does not offer any guarantee of reception of the data sent over the p-t-m channel. Therefore, a switch from a p-t-m transmission to a p-t-p transmission is enabled for the case that the mobile station 420 receives MBMS data via a p-t-m channel but can no longer acquire MBMS data through this p-t-m channel due to a drop of the link quality in this channel. This is the case, for example, when the mobile station 420 is located within area A of the above described FIG. 3b, but outside of area B of this figure. A channel switching in such a situation will be explained in the following with reference to FIG. 5.

Figure 5:
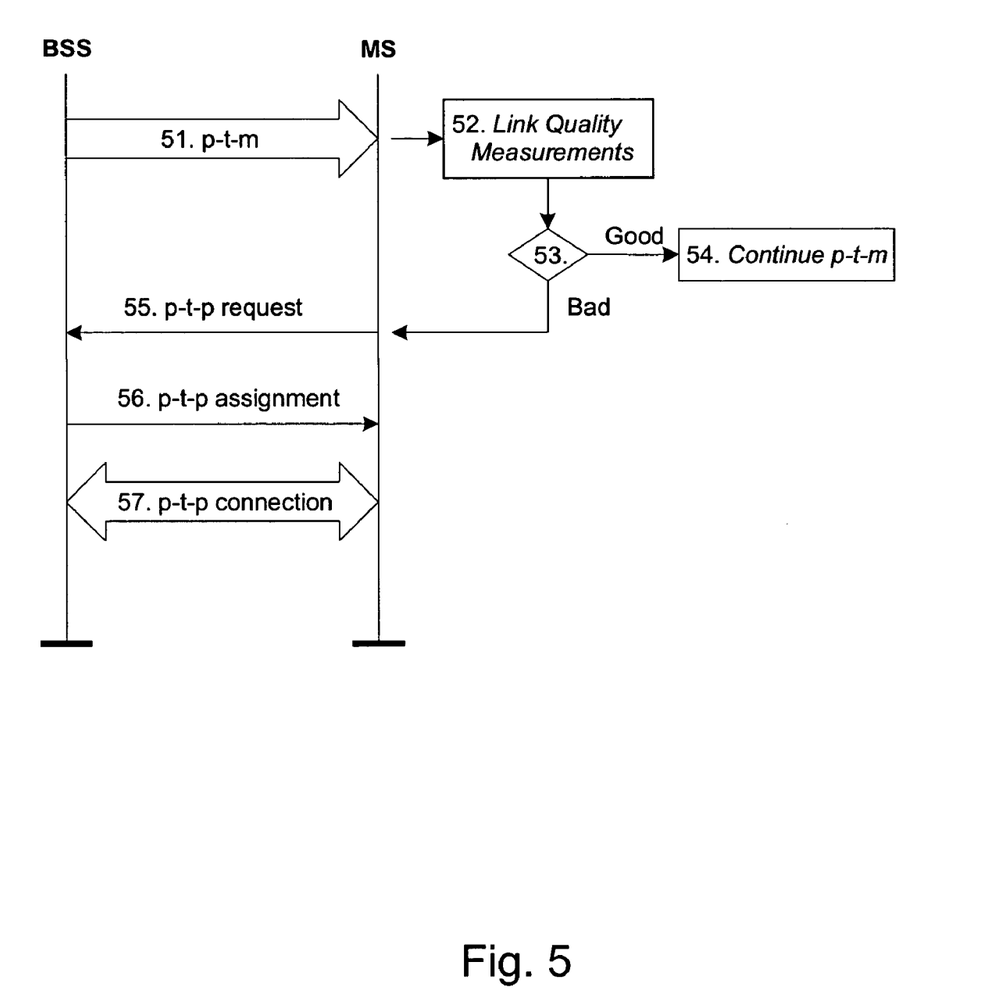
FIG. 5 is a rough signaling diagram illustrating an embodiment of the method according to the invention.

FIG. 5 is a signaling diagram illustrating the transmissions between the BSS 410 and the mobile station MS 420, and in addition some of the processing at the mobile station MS 420.

When MBMS data is received at the BSS 410, the channel selection and control portion 412 first selects a p-t-m channel for transmission of the MBMS data to all mobile stations which are to receive the MBMS data. The channel selection and control portion 412 establishes a p-t-m bearer on this channel and transmits bearer parameters required for a given service via the transceiver 411 to the mobile stations. Together with the bearer parameters, the channel selection and control portion 412 transmits a maximum value for the mean bit error probability MEAN_BEPmax and a minimum coefficient of variation of the bit error probability CV_BEPmin as threshold values to the mobile stations. The MBMS data is then transmitted via the transceiver 411 of the BSS 410 to the mobile stations using a single channel on the established p-t-m bearer. A new maximum value for the mean bit error probability MEAN_BEPmax and a new value for the minimum coefficient of variation of the bit error probability CV_BEPmin is transmitted to the mobile stations whenever a reconfiguration of the p-t-m bearer becomes necessary. All p-t-m related transmissions are indicated in FIG. 5 as step 51.

Before the start of the MBMS data transmission, the mobile station 420 receives the threshold values MEAN_BEPmax and CV_BEPmin via its transceiver 421 and provides them to the p-t-m to p-t-p processing portion 423. The mobile station 420 then receives the MBMS data via its transceiver 421 and forwards the data to the measuring portion 422. The measuring portion 422 performs link quality measurements on all p-t-m channels from which the mobile station 420 receives MBMS data. This is indicated in FIG. 5 as step 52. More specifically, the measuring portion 422 performs BEP (Bit Error Probability) measurements as introduced for EGPRS in the technical specification 3GPP TS 45.008 V5.11.0: "Technical Specification Group GSM/EDGE Radio Access Network; Radio subsystem link control", (2003-06), which is incorporated by reference herein. In this document it is requested, for instance, that the received signal quality for a channel is measured on a burst-by-burst basis in a manner that can be related to the BEP (Bit Error Probability) for each burst before channel decoding using, for example, soft output from the receiver. The measuring portion 422 forwards measured BEP related values to the p-t-m to p-t-p processing portion 423.

Based on the received measurement results, the p-t-m to p-t-p processing portion 423 calculates a MEAN_BEP (mean bit error probability) value and a CV_BEP (Coefficient of Variation of the BEP) value and compares the calculated values with the threshold values received from the BSS 410. This is indicated in FIG. 5 as step 53. As long as the calculated MEAN_BEP value remains below the received value MEAN_BEPmax and the calculated CV_BEP value remains above the received value CV_BEPmin, the mobile station 420 continues with the acquisition of the MBMS data through the p-t-m channel. This is indicated in FIG. 5 as step 54. A calculation of the values MEAN_BEP and CV_BEP is presented for example in the above mentioned technical specification TS 45.008.

In case the calculated MEAN_BEP value raises above the received value MEAN_BEPmax or in case the calculated CV_BEP value falls below the received value CV_BEPmin, however, it is assumed that the mobile station 420 might no longer be able to acquire the data on the p-t-m channel correctly. Therefore, the p-t-m to p-t-p processing portion 423 transmits a p-t-p request via the transceiver 421 to the BSS 410. This is indicated in FIG. 5 as step 55.

The p-t-m to p-t-p processing portion 413 of the BSS 410 receives this request via transceiver 411 and provides a corresponding control information to the channel selection and control portion 412. The channel selection and control portion 412 transmits thereupon via the transceiver 411 a p-t-p assignment to the mobile station 420, in order to establish a p-t-p bearer. This is indicated in FIG. 5 as step 56. Thereafter, the channel selection and control portion 412 transmits the MBMS data via the transceiver 411 to the mobile station 420 using the established dedicated p-t-p channel. This is indicated in FIG. 5 as step 57. The p-t-p connection can be controlled by means of a link adaptation and a power control, as known from the art, in order to guarantee the required link quality.

Figure 6:
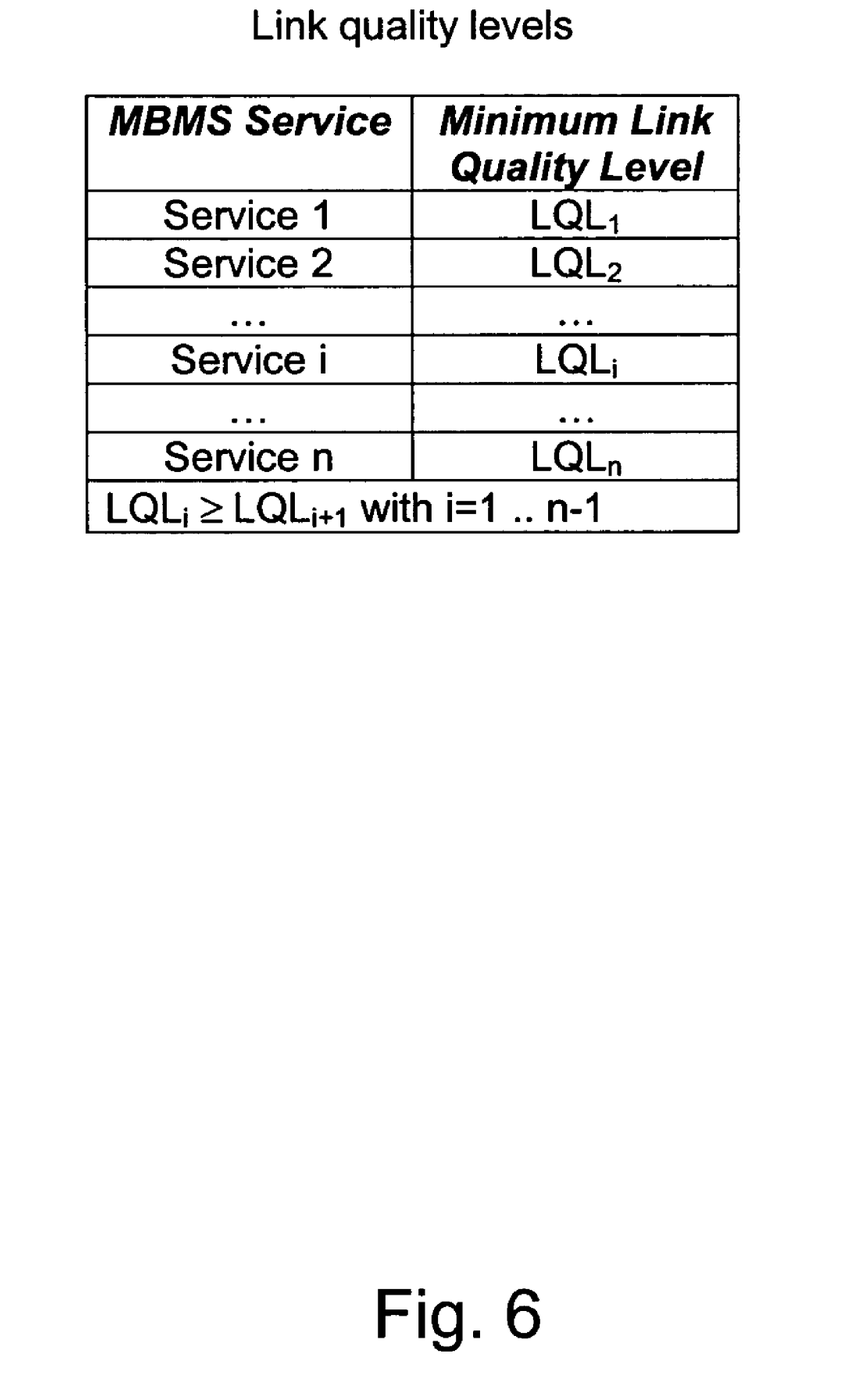
FIG. 6 is a table showing different link quality levels for different MBMS services.

It is to be noted that the mobile station 420 may receive more than one MBMS service on the p-t-m channel in parallel. Different received services may have different minimum link quality levels. For example, higher bitrates typically require a higher link quality. Therefore, the trigger for a p-t-p request by the mobile station 420 has to be based on the tightest link quality requirement. For illustration, the table of FIG. 6 presents a list of MBMS services monitored by the mobile station, Service i, with i=1 to n. To each of the services, a dedicated minimum link quality level $LQL_i$ is assigned, with i=1 to n. The list is sorted by the link quality levels according to the relation $LQL_i \geq LQL_{i+1}$, with i=1 to n−1. That is, Service 1 requires the highest minimum link quality level $LQL_1$, and Service n requires the lowest minimum link quality level $LQL_n$. Therefore, the p-t-m to p-t-p processing portion 423 calculates and monitors only the MEAN_BEP and the CV_BEP of Service 1.

A switch from a p-t-p to a p-t-m bearer is enabled in the system of FIG. 4 in order to save radio resources, if possible, in the case that the mobile station 420 receives MBMS data via a p-t-p channel. Such a situation will be explained in the following with reference to FIG. 7.

Figure 7:
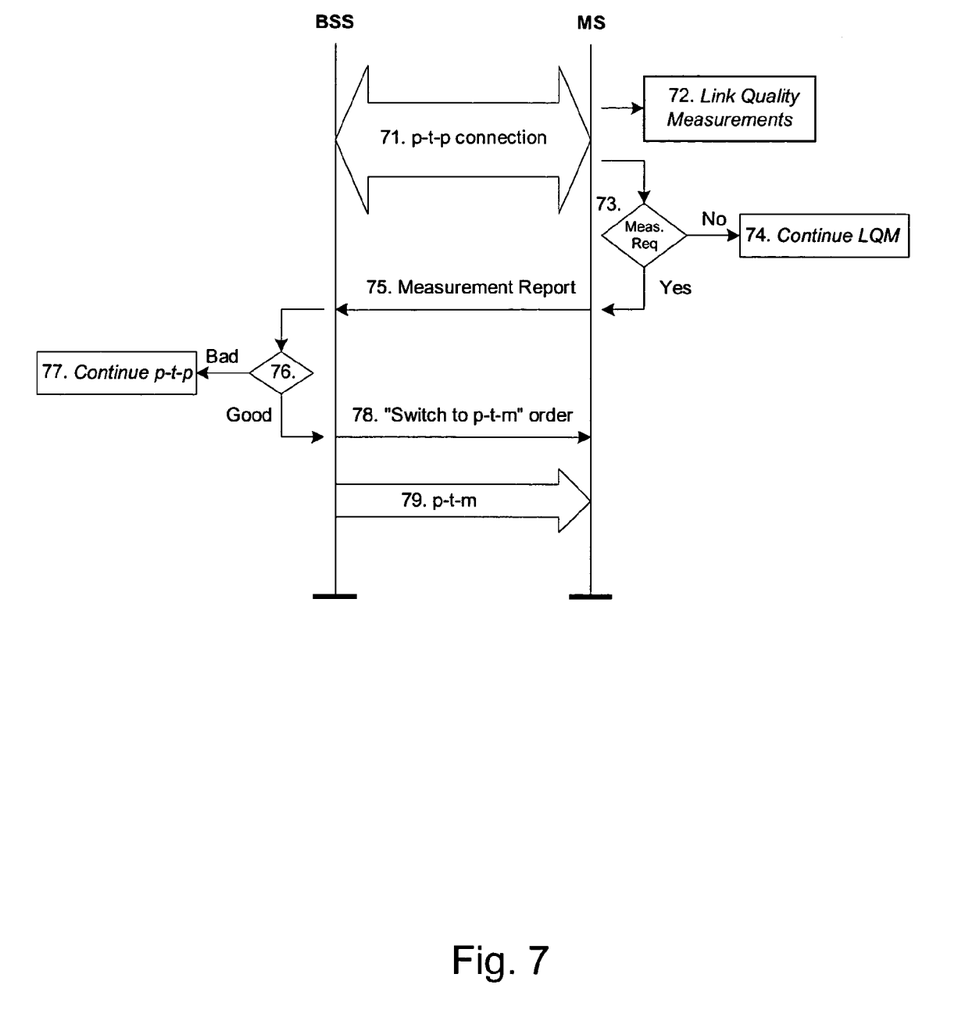
FIG. 7 is a further rough signaling diagram illustrating an embodiment of the method according to the invention.

FIG. 7 is a signaling diagram illustrating the transmissions between the BSS 410 and the mobile station 420, and in addition some processing in the BSS 410 and at the mobile station 420.

First, the channel selection and control portion 412 of the BSS 410 forwards MBMS data to the mobile station 420 using a dedicated p-t-p channel. This is indicated in FIG. 7 as step 71. The transmission may comprise a link quality measurement request, e.g. at regular intervals.

The mobile station 420 receives the bitstream comprising the MBMS data via its transceiver 421 and forwards the received bits to the measuring portion 422. The measuring portion 422 measures the link quality of all p-t-p channels from which the mobile station 420 receives MBMS data. The measuring portion 422 may perform for example again BEP measurements as introduced in the above mentioned technical specification 3GPP TS 45.008. This is indicated in FIG. 7 as step 72. The measuring portion 422 forwards the measurement results to the p-t-p to p-t-m processing portion 424.

In case the transmission in step 71 includes a measurement request, this request is provided by the transceiver 421 to the p-t-p to p-t-m processing portion 424.

The p-t-p to p-t-m processing portion 424 monitors whether a measurement request is received from the BSS 410. This is indicated in FIG. 7 as step 73. As long as no measurement request is received, the link quality measurements are continued. This is indicated in FIG. 7 as step 74.

In case a measurement request is received, the p-t-p to p-t-m processing portion 424 transmits a measurement report via the transceiver 421 to the BSS 410. This is indicated in FIG. 7 as step 75. The measurement report comprises the results of the measurements provided by the measuring portion 422 to the p-t-p to p-t-m processing portion 424.

In the BSS 410, the measurement report is forwarded by the transceiver 411 to the p-t-p to p-t-m processing portion 414. The p-t-p to p-t-m processing portion 414 estimates the currently achievable p-t-m channel quality, for instance by extrapolating the measured link quality on the p-t-p channel received in the measurement report. This is indicated in FIG. 7 as step 76.

In case the estimated achievable p-t-m channel quality lies below a given threshold value, the transmission via the p-t-p channel is continued. This is indicated in FIG. 7 as step 77. The threshold value may depend on the type of the MBMS service, as described with reference to FIG. 5.

In case the estimated achievable p-t-m channel quality lies above a given threshold value, it is assumed that the mobile station 420 can receive the MBMS data correctly through a p-t-m channel as well. Therefore, the p-t-p to p-t-m processing portion 414 causes the channel selection and control portion 412 to transmit a "Switch to p-t-m" order via the transceiver 411 to the mobile station 420. This is indicated in FIG. 7 as step 78. The "Switch to p-t-m" order comprises two messages. The first message is for instance a PACKET TBF RELEASE message and releases the p-t-p connection. The second message provides the p-t-m parameters required at the mobile station 420 for receiving data on a p-t-m channel. Alternatively, a single message could be used for releasing the p-t-p connection and for providing the p-t-m parameters. In either case, the p-t-m channel parameters for this particular service are advantageously informed to the mobile station 420 directly so that the mobile station 420 does not have to acquire these parameters through PBCCH or PNCH, respectively. This reduces the service gap during a bearer change.

Once the "Switch to p-t-m" order has been transmitted, the selection portion 412 forwards the MBMS data on a p-t-m channel via the transceiver 411 to the mobile station 420. This is indicated in FIG. 7 as step 79.

The mobile station 420 continues receiving the MBMS data on the p-t-m channel with a sufficient quality.

Special care has to be taken in case the mobile station 420 is not able to acquire a p-t-m channel in parallel with a p-t-p channel. In this case, all the p-t-p connections of the mobile station 420 have to be dropped, when a "Switch-to-p-t-m" order is sent to the mobile station 420.

Therefore, if the mobile station 420 is acquiring several MBMS services through several p-t-p connections, the "Switch to p-t-m" order by the BSS 410 should only be sent in case the highest required link quality of all the services which are monitored by the mobile station 420 is reached. In the table of FIG. 6, this corresponds to level $LQL_1$ for Service 1.

The coexistence of the two aspects depicted in FIGS. 5 and 7 in the system of FIG. 4 leads to the risk of a ping-pong effect in the switching from p-t-p to p-t-m and vice versa, which should be avoided. Therefore, once the p-t-p connection is established, it may be kept for as long as the MBMS session is active. That is, a switching from a p-t-p transmission to a p-t-m transmission is avoided within a cell. Further, the network may be allowed, as usual, to reject a p-t-p request from the mobile station. Alternatively, the mobile station may be prevented from transmitting the p-t-p request. The latter alternative would reduce the signaling amount, since it avoids repeated request/reject signaling.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
   determining by a mobile station of a link quality of a point-to-multipoint channel based on link quality related measurements on said point-to-multipoint channel, while receiving multicast data transmitted from a mobile communication network on a point-to-multipoint channel via a transceiver; and
   sending from said mobile station a request to said mobile communication network to switch and thereafter continue transmitting said multicast data via a point-topoint channel so that transmission of said multicast data is continuous through the switch, in case said determined link quality lies below a given link quality.

2. The method according to claim 1, further comprising said mobile communication network establishing a point-to-point channel to said mobile station upon receiving such a request to continue transmitting said multicast data via a point-to-point channel and transmitting said multicast data via said established point-to-point channel.

3. The method according to claim 1, wherein said determined link quality of said point-to-multipoint channel is represented at least by a determined mean bit error probability, wherein said given link quality is represented at least by a given maximum bit error probability, and wherein said determined link quality is assumed to lie below said given link quality in case said determined mean bit error probability lies above said given maximum bit error probability.

4. The method according to claim 1, wherein said determined link quality of said point-to-multipoint channel is represented at least by a determined coefficient of variation of a bit error probability, wherein said given link quality is represented at least by a given minimum coefficient of variation of a bit error probability, and wherein said link quality is assumed to lie below said given link quality in case said determined coefficient of variation of a bit error probability lies below said given minimum coefficient of variation of a bit error probability.

5. The method according to claim 1, further comprising said mobile communication network providing an indication of said given link quality to said mobile station.

6. The method according to claim 5, wherein said mobile communication network provides an indication of said given link quality to said mobile station for each multicast service for which multicast data is to be transmitted to said mobile station.

7. The method according to claim 1, wherein in case said mobile station receives multicast data for at least two multicast services via said point-to-multipoint channel, a given link quality is available for each of said multicast services at said mobile station, and said mobile station requests from said mobile communication network the transmission of said multicast data via a point-to-point channel in case said determined link quality lies below the highest of said given link qualities.

8. The method according to claim 1, further comprising for supporting a switch from said point-to-point channel to said point-to-multipoint channel for transmitting multicast data from said mobile communication network to said mobile station:
    said mobile communication network estimating a link quality of said point-to-multipoint channel while transmitting multicast data on said point-to-point channel to said mobile station; and
    in case said estimated link quality of said point-to-multipoint channel reaches a required link quality, said mobile communication network ordering said mobile station to switch from said point-to-point channel to said point-to-multipoint channel for receiving said multicast data.

9. The method according to claim 8, further comprising preventing repeatedly switching between said point-to-point channel and said point-to-multipoint channel for a transmission of multicast data belonging a single session of a multicast service, as long as said mobile station remains within one cell served by said mobile communication network.

10. An apparatus comprising:
    a receiver configured to receive multicast data;
    a measuring portion configured to perform link quality related measurements on a point-to-multipoint channel via which said receiver receives multicast data from a mobile communication network;
    a processing portion configured to determine a link quality of said point-to-multipoint channel based on measurement results provided by said measuring portion and for comparing a determined link quality with a given link quality; and
    a transmitter configured to transmit a request to said mobile communication network to switch and thereafter continue transmitting said multicast data via a point-to-point channel so that the transmission of said multicast data is continuous through the switch, in case said processing portion detects that a determined link quality of a point-to-multipoint channel employed for transmitting multicast data lies below a given link quality.

11. The apparatus according to claim 10, wherein said apparatus is a mobile station.

12. The apparatus according to claim 10, wherein said determined link quality of said point-to-multipoint channel is represented at least by a determined mean bit error probability, wherein said given link quality is represented at least by a given maximum bit error probability, and wherein said processing portion is configured to assume a link quality to lie below said given link quality in case said determined mean bit error probability lies above said given maximum bit error probability.

13. The apparatus according to claim 10, wherein said determined link quality of said point-to-multipoint channel is represented at least by a determined coefficient of variation of a bit error probability, wherein said given link quality is represented at least by a given minimum coefficient of variation of a bit error probability, and wherein said processing portion is configured to assume a link quality to lie below said given link quality in case said determined coefficient of variation of a bit error probability lies below said given minimum coefficient of variation of a bit error probability.

14. The apparatus according to claim 10, wherein in case said receiver receives multicast data for at least two multicast service via said point-to-multipoint channel, a given link quality is available for each of said multicast services, and wherein said transmitter is configured to transmit a request to said mobile communication network to transmit said multicast data via a point-to-point channel in case said determined link quality lies below the highest of said given link qualities.

15. A non-transitory processor readable medium stored with code, which when executed by a processor of a mobile station, causes said processor to perform:
    determining at a link quality of a point-to-multipoint channel based on link quality related measurements on said point-to-multipoint channel, while receiving multicast data transmitted from a mobile communication network on a point-to-multipoint channel via a transceiver; and
    sending a request to said mobile communication network to switch and thereafter continue transmitting said multicast data via a point-to-point channel so that transmission of said multicast data is continuous through the switch, in case said determined link quality lies below a given link quality.

16. A method comprising:
    a mobile communication network requesting and receiving from a mobile station measurement results for link quality related measurements on a point-to-point channel, which point-to-point channel is currently used by said mobile communication network for transmitting multicast data to said mobile station, estimating by said mobile communication network a link quality of a point-to-multipoint channel while transmitting multicast data on said point-to-point channel to said mobile station via a transceiver, wherein said mobile communication network estimates said link quality of said point-to-multipoint channel based on said measurement results for said point-to-point channel, in case said estimated link quality of said point-to-multipoint channel reaches a required link quality, said mobile communication network ordering said mobile station to switch from said point-to-point channel to said point-to-multipoint channel for receiving said multicast data.

17. A method comprising:

estimating by a mobile communication network a link quality of a point-to-multipoint channel while transmitting multicast data on a point-to-point channel to a mobile station via a transceiver; and in case said estimated link quality of said point-to-multipoint channel reaches a required link quality, ordering said mobile station to switch from said point-to-point channel to said point-to-multipoint channel for receiving said multicast data, wherein said mobile communication network orders said mobile station to switch from said point-to-point channel to said point-to-multipoint channel for receiving said multicast data by a switch order, which switch order releases said point-to-point connection and provides parameters for said point-to-multipoint channel to said mobile station.

18. The method according to claim 17, wherein in case said mobile station receives from said mobile communication network multicast data of at least two multicast services via at least two point-to-point channels, each multicast service requiring a dedicated link quality, said mobile communication network switches from said point-to-point channels to a point-to-multipoint channel for transmitting said multicast data only, in case the highest required link quality of all multicast services is reached.

19. An apparatus comprising:

a transmitter configured to transmit multicast data using at least one of a point-to-point channel and a point-to-multipoint channel; and a processor configured to estimate a link quality of a point-to-multipoint channel while said transmitter transmits multicast data to a mobile station on a point-to-point channel, and configured to order said mobile station to switch from said point-to-point channel to said point-to-multipoint channel for receiving said multicast data by a switch order, in case said estimated link quality lies above a required link quality;

wherein said switch order releases said point-to-point connection and provides parameters for said point-to-multipoint channel to said mobile station.

20. The apparatus according to claim 19, wherein said apparatus is in a sub-network of a mobile communication network.

21. The apparatus according to claim 19, wherein for the case that said mobile station receives from said apparatus multicast data of at least two multicast services via at least two point-to-point channels, each multicast service requiring a dedicated link quality, said processing portion is configured to cause said transmitter to switch from said point-to-point channels to a point-to-multipoint channel for transmitting said multicast data only, in case the highest required link quality of all multicast services is reached.

22. A mobile communication system comprising: a mobile station and an apparatus comprising: a transmitter configured to transmit multicast data using at least one of a point-to-point channel and a point-to-multipoint channel; and a processor configured to estimate a link quality of a point-to-multipoint channel while said transmitter transmits multicast data to a mobile station on a point-to-point channel, and configured to order said mobile station to switch from said point-to-point channel to said point-to-multipoint channel for receiving said multicast data by a switch order, in case said estimated link quality lies above a required link quality; wherein said switch order releases said point-to-point connection and provides parameters for said point-to-multipoint channel to said mobile station, wherein said mobile station comprises a receiver configured to receive multicast data from said apparatus.

23. The mobile communication system according to claim 22 wherein said mobile station further comprises:

a measuring portion configured to perform link quality related measurements on a point-to-point channel via which said mobile station receives multicast data from said apparatus; and a transmitter configured to transmit measurement results of said measuring portion to said apparatus, and wherein said apparatus further comprises:

a receiver configured to receive from said mobile station measurement results on the link quality of a point-to-point channel employed by said apparatus for transmitting multicast data to said mobile station, said processing portion configured to estimate said link quality of said point-to-multipoint channel from measurement results received by said receiving portion from a mobile station.

24. A non-transitory processor readable medium stored with code, which when executed by a processor of a mobile communication network, causes said processor to perform:

estimating a link quality of a point-to-multipoint channel while transmitting multicast data on a point-to-point channel to a mobile station via a transceiver; and in case said estimated link quality of said point-to-multipoint channel reaches a required link quality, ordering said mobile station to switch from said point-to-point channel to said point-to-multipoint channel for receiving said multicast data, wherein said mobile communication network orders said mobile station to switch from said point-to-point channel to said point-to-multipoint channel for receiving said multicast data by a switch order, which switch order releases said point-to-point connection and provides parameter for said point-to-multipoint channel to said mobile station.

25. An apparatus comprising:

means for receiving multicast data;

means for performing link quality related measurements on a point-to-multipoint channel via which said means for receiving receives multicast data from a mobile communication network;

means for determining a link quality of a point-to-multipoint channel based on measurement results provided by said means for performing link quality related measurements, and for comparing a determined link quality with a given link quality; and means for transmitting a request to said mobile communication network to switch and thereafter continue transmitting said multicast data via a point-to-point channel to said means for receiving so that the transmission of said multicast data is continuous through the switch, in case said means for determining detects that a determined link quality of a point-to-multipoint channel employed for transmitting multicast data lies below a given link quality.

26. An apparatus comprising:

means for transmitting multicast data using at least one of a point-to-point channel and a point-to-multipoint channel; and means for estimating a link quality of a point-to-multipoint channel while said means for transmitting transmits multicast data to a mobile station on a point-to-point channel for transmitting multicast data to said mobile station, and for ordering said mobile station to switch from said point-to-point channel to said point-to-multipoint channel for thereafter receiving multicast data by means of a switch order, in case said estimated link quality lies above a required link quality;

wherein said switch order releases said point-to-point connection and provides parameters for said point-to-multipoint channel to said mobile station.

27. A method comprising:

performing by a mobile station link quality related measurements on a point-to-point channel, which point-to-point channel is currently used by a mobile communication network for transmitting multicast data to said mobile station via a transceiver, and transmitting measurement results from said mobile station to said mobile communication network upon request by said mobile communication network, wherein said measurement results are suited to enable said mobile communication network to estimate a link quality of said point-to-multipoint channel while transmitting multicast data on said point-to-point channel to said mobile station;

receiving at said mobile station an order from said mobile communication network to switch from said point-to-point channel to said point-to-multipoint channel for receiving said multicast data, in case said mobile communication network determined that said estimated link quality of said point-to-multipoint channel reaches a required link quality, and switching at said mobile station from said point-to-point channel to said point-to-multipoint channel for receiving said multicast data upon receipt of said order.

28. An apparatus for a mobile communication network comprising:

a communication component configured to request and receive from a mobile station measurement results for link quality related measurements on a point-to-point channel while said point-to-point channel is used by said mobile communication network for transmitting multicast data to said mobile station, a first processing component configured to estimate a link quality of a point-to-multipoint channel while said mobile communication network is transmitting multicast data on said point-to-point channel to said mobile station, wherein said first processing component is configured to estimate said link quality of said point-to-multipoint channel based on said measurement results for said point-to-point channel, and a second processing component configured to order said mobile station to switch from said point-to-point channel to said point-to-multipoint channel for receiving said multicast data in case said estimated link quality of said point-to-multipoint channel reaches a required link quality.

29. An apparatus comprising:

a measurement component configured to perform link quality related measurements on a point-to-point channel, which point-to-point channel is currently used by a mobile communication network for transmitting multicast data to said apparatus, and transmitting measurement results to said mobile communication network upon request by said mobile communication network, wherein said measurement results are suited to enable said mobile communication network to estimate a link quality of said point-to-multipoint channel while transmitting multicast data on said point-to-point channel to said mobile station; and a switching component configured to receive an order from said mobile communication network to switch from said point-to-point channel to said point-to-multipoint channel for receiving said multicast data, in case said mobile communication network determined that said estimated link quality of said point-to-multipoint channel reaches a required link quality, and to switch from said point-to-point channel to said point-to-multipoint channel for receiving said multicast data upon receipt of said order.

* * * * *